Sept. 23, 1969          M. A. OLSON          3,468,381
TURFING TOOL
Filed April 1, 1966
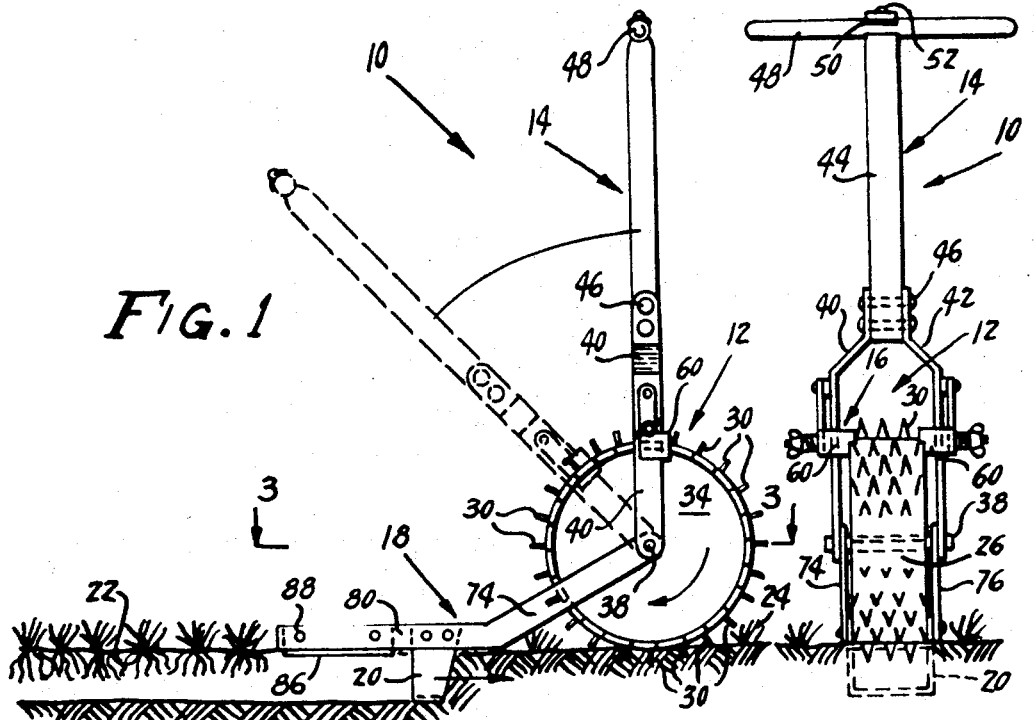
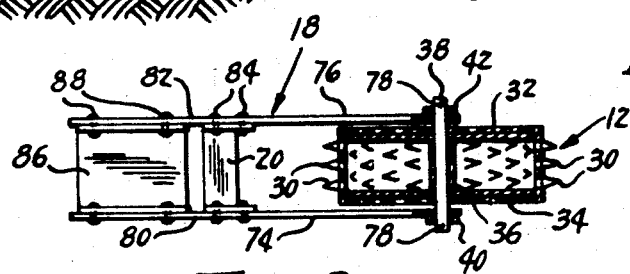
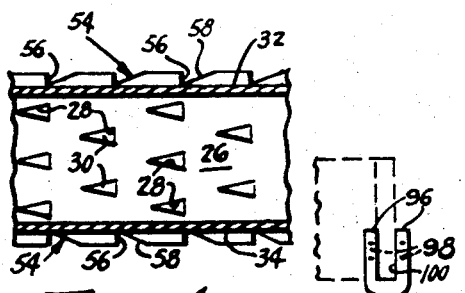   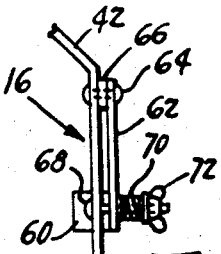
INVENTOR.
MARVIN A. OLSON
BY
ATTORNEYS.

United States Patent Office 3,468,381
Patented Sept. 23, 1969

3,468,381
TURFING TOOL
Marvin A. Olson, 7655 Manorside Drive,
Sacramento, Calif. 95832
Filed Apr. 1, 1966, Ser. No. 539,565
Int. Cl. A01b *45/04, 1/00, 3/02*
U.S. Cl. 172—19                                    3 Claims

ABSTRACT OF THE DISCLOSURE

A hand driven turfing tool for cutting sod in which the opposite side edges of the band of a wheel are provided with ratchet teeth engaged by pawls on a handle yoke for driving the wheel to pull the turf cutter through the turf.

---

This invention relates to a turfing tool which may be manipulated by a single individual to traverse a predetermined for cutting the sod along the area covered by the tool.

It is well known in the art to provide sod cutters for cutting a swath through a patch of mature grass to remove a strip of sod for transplanting purposes. Although machine driven sod cutters have been most used by the prior art, hand operated sod cutters are known for the indicated purposes. The hand operated sod cutters of the prior art usually comprise a generally U-shaped blade mounted on a movable frame which the operator pushes through the mature grass to sever a strip. One difficulty found with the sod cutters of the prior art is that a tremendous amount of effort is required to push the sod cutter through the grass. Another disadvantage found in the sod cutters of the prior art is that they are limited to used as a sod cutter and for no other purposes.

It is an object of the instant invention to provide a hand operated turfing tool which may be used either as a sod cutter or, with certain adjustments, as an edger to form a border around a permanent structure, such as a sidewalk, building or the like.

Another object of the instant invention is to provide a turfing tool having at least a pair of interchangeable cutting blades for selectively cutting a swath of the sod or forming a border around a permanent structure.

A further object of the instant invention is to provide a turfing tool equipped with hand operated means for driving the tool along a predetermined path for performing the desired sod cutting operations.

A still further object of the instant invention is to provide a turfing tool having a ground engaging wheel driven by a ratchet and pawl mechanism actuated by an oscillating rotation of the handle.

A more specific object of the instant invention is to provide a turfing tool having an exteriorly cleated circumferential ground engaging wheel forming a series of ratchets for engagement with a pawl mounted on a movable handle.

Other objects and advantages of the instant invention reside in the combination of elements, arrangements of parts and features of construction, all as will be more fully pointed out hereinafter and disclosed in the accompanying drawing wherein there is shown a preferred embodiment of this inventive concept.

In the drawing:

FIGURE 1 is a side elevational view of the turfing tool of the instant invention illustrating the handle thereof in dotted lines prior to incrementally advancing the tool;

FIGURE 2 is a front elevational view of the turfing tool of FIGURE 1;

FIGURE 3 is a horizontal cross-sectional view of the tool of FIGURES 1 and 2 taken substantially along line 3—3 of FIGURE 1 as viewed in the direction indicated by the arrows;

FIGURE 4 is an enlarged view of a segment of the ground engaging wheel illustrating the ratchets formed on either side thereof;

FIGURE 5 is an enlarged view of the spring biased pawl affixed to the handle of the turfing tool illustrated in FIGURES 1 and 2; and FIGURE 6 is a front elevational view of another form or turfing blade which may be used with the tool of the instant invention for cutting a path adjacent a permanent structure, such as a building, sidewalk or the like.

Referring now to the drawing in detail, wherein like reference characters designate like elements throughout the several views thereof, there is shown generally at 10 the turfing tool of the instant invention having as its major components a ground engaging wheel shown generally at 12, a handle designated generally at 14 operating a ratchet and pawl drive mechanism shown generally at 16, and a movable frame illustrated generally at 18 carrying a U-shaped blade 20 for severing a strip of sod 22 from a mature patch of grass 24. In the operation of turfing tool 10, an individual places one foot on the rearward extremity of frame 18 and rotatably oscillates handle 14 to drive wheel 12 through driving mechanism 16. The traversal of tool 10 through grass patch 24 allows blade 20 to sever strip 22 from patch 24.

Wheel 12 includes a circumferential band 26 apertured as at 28 to form a plurality of outwardly extending V-shaped planar wedges 30 engaging ground 24 to provide traction for turfing tool 10. Circumfential band 26 is strengthened by a pair of circular spaced apart plates 32, 34 located intermediate the edges of band 26. A centrally located journal 36 extends between the plates 32, 34 and receives an axle 38 thereby mounting wheel 12 for rotation.

Handle 14 includes a bifurcated lower end comprised of a pair of legs 40, 42 journaled on axle 38 and fixedly secured to an integral extension 44 by a plurality of transverse connecting means 46 such as rivets, nuts and bolts or the like. Handle 14 also includes a transverse T-bar 48 affixed to the upper end of extension 44 by a suitable arcuate plate 50 and a screw connector 52.

As may be seen best in FIGURES 3 and 4, the outer edges of band 26 forms a series of ratchet recesses shown generally at 54 having a substantially vertical face 56 and an angled face 58. Engaging vertical faces 56 of ratchet notches 54 is a plate-like pawl 60 movably mounted on each of legs 40, 42 by a spring metal arm 62, a transverse rivet 64, and a bushing 66 between arm 62 and leg 42 as may be seen best in FIGURE 5. A guide rod 68 extends through leg 42 and arm 62 and is received in a compression spring 70 constrained about guide rod 68 by a wing nut 72.

It will be readily apparent that compression spring 70 acts to bias pawl 60 into engagement with ratchet recesses 54 as may be seen best in FIGURE 2. When handle 14 is rotated rearwardly to the dotted line position of FIGURE 1, pawl 60 will be cammed out of engagement with successive ratchet recesses 54 by angled faces 58. Conversely, when handle 14 is rotated in the direction shown by the arrow in FIGURE 1, pawl 60 will be cammed into engagement with vertical face 56 of a selected ratchet notch 54 to rotate wheel 12 thereby propelling turfing tool 10.

Referring now to FIGURES 1 to 3 inclusive, frame 18 includes a pair of upwardly angled arms 74, 76 journaled about axle 38 between leg 42 and plate 32 and between leg 40 and plate 34 as shown in FIGURE 2. In order to retain all of the journaled elements on axle 38, a pair of cotter keys 78 may be provided on the outer end of axle 38 in a conventional manner. Frame 18 also includes a pair of horizontal rearwardly extending plates 80, 82 respectively integral with arms 74, 76. Plates 80, 82 are maintained in a spaced apart relation by U-shaped blade 20 which is secured therebetween by a plurality of releasable fasteners 84, such as nuts and bolts. A foot rest 86 is affixed between plates 80, 82 by suitable fasteners 88 with the lower surface of foot rest 86 extending below the bottom edges of plates 80, 82 as may be seen in FIGURE 1.

In the use of turfing tool 10, the operator first places one foot on foot rest 86 and retracts handle 14 to the dotted line position shown in FIGURE 1. In the retraction of handle 14, each angled face 58 of ratchet recesses 54 sequentially cams plate-like pawl 60 out of engagement with recess 54 to allow the retraction of handle 14. The individual then forcibly rotates handle 14 in the direction shown by the arrow in FIGURE 1 while maintaining a portion of his weight on foot rest 86. Pawl 60 is biased by spring 70 into engagement with vertical face 56 of notch thereby providing a driving connection between handle 14 and wheel 12.

Since the individual's weight is on foot rest 86 during the traversal of turfing tool 10, cutting blade 20 will be forced from a position on the surface of grass patch 24 to the digging position shown in FIGURE 1. When the lower surface of foot rest 86 comes into contact with the ground surface, the depth of cutting blade 20 is fixed. By the individual keeping a portion of his weight on foot rest 18 and rotatably oscillating handle 14, it will be seen that turfing tool 10 will be propelled along a substantially straight path. During the movement of turfing tool 10, U-shaped cutting blade 20 is severing sod strip 22 from grass patch 24 such that it may be easily rolled and moved to a transplanting site. Since the individual maintains a portion of his weight on foot rest 86 during the movement of turfing tool 10, the thickness of sod strip 22 will remain substantially constant. In a short practice period, an individual learns to operate turfing tool 10 for rapidly cutting sod strip 22.

Referring now to FIGURE 6, another form of cutting tool is illustrated generally at 90 and may be interchanged with U-shaped turfing blade 20 for forming a small ditch or path adjacent a permanent structure. Blade 90 is generally L-shaped in cross-section having an upstanding shank 92 and a horizontally extending plate 94 each of which are sharpened into the V-shaped configuration indicated. The upper end of shank 92 is bifurcated to form a pair of ears 96 each of which provide a pair of longitudinally spaced apertures 98. When it is desired to remove the turf adjacent a permanent object, cutting blade 20 will be removed by detaching releasable fasteners 84 and inserting plate 82 in slot 100 between ears 96 of blade 90. Releasable fasteners 84 are then reattached to frame plate 82 extending through apertures 98 of blade 90. Since the assembly of blade 90 onto frame 18 is such that cutting plate 94 extends laterally of frame 18, as for example to the right of illustrated blade 20 in FIGURE 2, turfing tool 10 is propelled around the periphery of the sidewalk, building or the like in a manner as previously described.

It is now seen that there is herein provided a turfing tool which accomplishes all of the objects and advantages of the instant invention and others, including many advantages of great practical utility and commercial importance.

Since many embodiments may be made in the instant inventive concept, and since many modifications may be made in the embodiment hereinbefore shown and described, it is to be understood that the foregoing is to be interpreted merely as illustrative and not in a limiting sense.

I claim:
1. A turfing tool comprising
a wheel including a relatively wide circumferential band,
a pair of spaced apart parallel circular plates supporting said band and rigidly secured thereto, said band having a series of ratchet notches formed in the opposite side edges thereof,
a plurality of wedge shaped cleats struck from said band and bent to extend radially outwardly therefrom for increasing the traction of said wheel,
an axle extending centrally through said plates journalling the wheel for rotation about a horizontal axis,
means for driving the wheel including
a handle having a bifurcated yoke at its lower end including legs journaled on the axle for rotation thereon,
a pawl movably mounted on each leg for movement toward and away from the ratchet notches on the respective side edges of the band,
means biasing the pawls toward the ratchet notches for drivably engaging the wheel upon rotation of the handle in a first direction and for releasing the pawl from the ratchet notches upon rotation of the handle in the opposite direction,
a frame journaled on the axle and extending rearwardly of the wheel for supporting the operator of the tool, and
a turfing blade on the frame extending below the level of the wheel for digging a path in the underlying surface.

2. The turfing tool of claim 1 wherein the blade is generally U shaped in configuration for cutting a swath of sod from the underlying surface.

3. The turfing tool of claim 1 wherein the frame extends rearwardly of the wheel substantially parallel to the plane of travel and the turfing blade is L shaped and secured to one edge of the frame with the outwardly extending portion thereof lying beyond the width of the wheel for cutting a path adjacent a permanent structure.

References Cited
UNITED STATES PATENTS

| | | | |
|---|---|---|---|
| 1,304,375 | 5/1919 | Robinet | 172—554 |
| 1,472,102 | 10/1923 | Uriga | 172—352 |
| 2,844,084 | 7/1958 | Greenland | 172—16 |

FOREIGN PATENTS

| | | |
|---|---|---|
| 789,231 | 8/1935 | France. |
| 346,783 | 1/1922 | Germany. |
| 110,527 | 5/1940 | Australia. |

ROBERT E. PULFREY, Primary Examiner

J. W. PETERSON, Assistant Examiner

U.S. Cl. X.R.

172—292, 352